3,389,090
ASPHALT EMULSIONS
Stanley D. Turk, Anton M. Schnitzer, and Billy D. Simpson, Bartlesville, Okla., assignors to Phillips Petroleum Company, a corporation of Delaware
No Drawing. Filed Dec. 31, 1964, Ser. No. 422,515
3 Claims. (Cl. 252—311.5)

ABSTRACT OF THE DISCLOSURE

N-long-chain secondary alkyl-1,3-propanediamines are used as emulsifying agents in the preparation of asphalt emulsions.

---

This invention relates to a method for preparing asphalt emulsions. This invention also relates to emulsions prepared by employing novel emulsifying agents.

Heretofore, N-long-chain alkyl - 1,3 - propanediamines have been prepared from naturally occurring fatty acids such as those obtained from coconut oil, soybean oil, beef tallow, and the like. Since these diamines are prepared from fatty acids which inherently have the carboxyl group in the terminal position, the long-chain aliphatic groups are primary radicals, i.e., the alkyl group is bound to the nitrogen atom by means of a primary carbon atom. These amines are represented by the following formula:

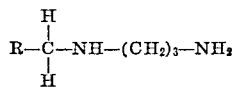

wherein R represents a primary alkyl radical of up to about 22 carbon atoms.

These diamines prepared from fatty acids have been used as emulsifying agents in the preparation of asphalt emulsions. However, these emulsifying agents generally must be purified to remove minor impurities present. Furthermore, fatty acids are a relative expensive starting material from which to prepare emulsifying agents and therefore the agents themselves tend to be relatively expensive.

Quite unexpectedly, it has now been found that if the long-chain radical in the above formula is a secondary instead of a primary radical there is produced an emulsifying agent which is superior in its emulsifying properties over that of the fatty diamine. The emulsifying agent of this invention can be employed in an unpurified or crude form and is prepared from a less expensive starting material.

Accordingly, it is an object of this invention to provide an improved method for preparing emulsions. It is another object of this invention to provide an emulsion employing a new and improved emulsifying agent.

Other aspects, objects and the several advantages of the invention will be apparent to those skilled in the art from the description and the appended claims.

According to this invention an asphalt emulsion is prepared by mixing asphalt, a dispersing liquid and an effective amount of an emulsifying agent having the formula:

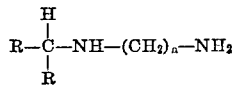

wherein each R group is an alkyl radical, the sum of the carbon atoms in the two R groups is in the range of 11 to 22, preferably 13 to 19, and $n$ is an integer from 2 to 6, preferably 3.

The diamines of this invention can be easily prepared by conventional methods known in the art. It is preferred to prepare the diamines starting from suitable secondary haloparaffins, preferably containing a halogen selected from the group consisting of chlorine, bromine and iodine, still more preferably chlorine. The haloparaffins will have a halogen attached to a carbon atom which is attached to two other carbon atoms and will contain from about 12 to about 23, preferably from about 14 to about 20, carbon atoms per molecule and substantially one halogen atom per molecule. The haloparaffins are acyclic and preferably unbranched.

Generally, any conventional paraffin halogenation process which produces at least 85 mole percent of secondary haloparaffins can be employed to prepare the haloparaffins which are to be subsequently aminated and cyanoethylated to form the inventive diamine. Such conventional processes include continuous vapor phase thermal halogenation, batch liquid phase halogenation, and the like. The halogenation can be catalyzed by light, ferric chloride, iodoform, benzoyl peroxide, and the like, or can be carried out without benefit of a catalyst. In addition to the use of elemental halogens, halogenating agents such as sulfuryl chloride, thionyl chloride, and the like can be employed. Also, any type of conventional contacting of the paraffin and halogenating agent including an electrolytic cell can be employed.

The haloparaffins can be aminated by known methods. The amination can be carried out by contacting the haloparaffin with ammonia in the presence of a polar solvent such as methanol at temperatures from about 170° to about 250° C., at autogenous pressures and for about 0.1 to about 10 hours. The primary amine so formed can be recovered by conventional methods such as distillation, solvent extraction, and the like.

The primary amine so produced can then be cyanoethylated conventionally such as by contacting same with an excess of an unsaturated nitrile compound such as acrylonitrile at from about 50° to about 100° C. The resulting cyano product, for example, cyanoethylalkylamine in the case of acrylonitrile, can then be conventionally hydrogenated, for example by exposure to hydrogen at 50–300° C. and 100–2000 p.s.i. in the presence of a catalyst such as nickel-kieselguhr, Raney nickel and the like. There is thus produced in crude or impure form the N-long-chain secondary alkyl amine, for example N-long-chain secondary alkyl-1,3-propanediamine in the case of acrylonitrile, which is the emulsifying agent of this invention.

The diamine formed by the above-described process can be utilized as an emulsifying agent in the impure or crude form or in a relatively purified form obtained by conventional purification treatments such as distillation to remove minor impurities from the final and/or intermediate products. Thus, the diamine is useful even though it may contain minor quantities of impurities, by-products and the like such as may be present, formed during and/ or due to the halogenation, amination, cyanoethylation and other preparation steps above set forth.

The asphalt emulsions of this invention can be prepared by conventional methods known in the art which include first making an aqueous dispersion or solution of the emulsifying agent, which is then mixed in a colloid mill or similar mixing device with an asphalt. The asphalt is preferably first heated to reduce its viscosity and then added hot. Other emulsifying agents and/or additives can be incorporated in emulsions of this invention by adding same to the solution or dispersion of the emulsifying agent, to the asphalt, or both. Additional emulsifying agents and additives can also be added after emulsification of the asphalt, particularly after cooling the emulsion, as well as or in addition to the method described above. Of significant importance are auxiliary emulsifying agents such as those of certain nonionic types which are used to convert otherwise rapid setting emulsions into slow setting emulsions.

Generally, any emulsifier and any additives are dispersed into the water. The dispersion is then warmed to a temperature of from about 90° to about 200° F., preferably from about 90° to about 125° F. The asphalt can be heated to a temperature in the range of from about 100° to about 350° F., preferably from about 250° to about 300° F. The dispersion and hot asphalt are then added to a colloid mill to emulsify the mixture. During such mixing the temperature of the mixture can be in the range of from about 100° to about 210° F., preferably from about 150° to about 200° F. The amount of diamine present in the emulsion will vary widely and need be only an amount effective to promote the formation of an emulsion of asphalt in the aqueous medium. Generally, the amount of diamine will be from about 0.05 to about 1.5, preferably from about 0.25 to about 0.5, weight percent based on the total weight of the emulsion. The completed emulsion can then be cooled to a temperature below about 150° F. and stored or used as such. Asphalts which can be used in the preparation of the emulsioins of this invention include any of those bituminous materials used heretofore and known in the art. Such asphalts can be natural asphalts or those derived from pertoleum refining, for example by steam refining and/or air blowing, and the like. The asphalts can be prepared from any petroleum source such as crude oil, topped crude oil, and the like. Suitable, but not exclusive asphalts include those having a penetration (ASTM D5) of from 0 to at least 300, preferably from about 40 to about 300, and softening points (ASTM D36–26) in the range of from about 90° to about 250° F., preferably from about 100° to about 150° F.

Emulsifying agents and additives which are conventionally used in the preparation of emulsions can also be present in the emulsions of this invention. For example, stabilizing agents such as hydroxyethyl cellulose, aluminum chloride, calcium chloride, and the like can be employed. Also, other auxiliary emulsifying agents, particularly agents of the type which control the mixing time of the emulsion with the aggregate, thus producing either slow-setting or rapid-setting emulsions, can be employed. Such emulsifying agents are of the nonionic type of which representative examples are: a mixture of octylphenoxypoly(ethyleneoxy)ethanols with 7 to 8 ethyleneoxy groups in the poly(ethyleneoxy) chain; nonylphenoxypoly(ethyleneoxy)ethanols with 9 to 11 ethyleneoxy groups in the poly(ethyleneoxy) chain, and the like. Other conventional additives can be employed. Generally, when used such additives will vary from a trace to about 0.5 weight percent of the emulsion. The asphalt emulsions of this invention can be applied in paving, resurfacing, coating, etc., and will produce good uniform and smooth coatings. The emulsions can be mixed with aggregate, for example in the ratio of 0.5 to 5 parts emulsion to 4 to 10 parts aggregate, and the resulting slurry applied to the surface desired to be treated. After such application, the slurry sets up in the usual manner to provide an adhering coating. The aggregate to be used preferably has a moisture content in the range of 5 to 20 weight percent, and dry aggregate can be prewet to provide this moisture content. The electronegative aggregates, such as gravel, sand and other siliceous materials, are preferred in preparing slurries of the same with cationic asphalt emulsions.

In slow-setting formulations the emulsion is premixed with a quantity of siliceous aggregate and the resulting slurry is applied to the surface which is to be treated. In such a technique the asphalt emulsion and the aggregate are applied simultaneously and the asphalt emulsion formulation is such that the emulsion will not break and the slurry will not set until the total slurry has been put into place. A variation of this technique is termed "slurry seal" and in this case fine moist sand is mixed with the asphalt emulsion to form a slurry of a consistency similar to that of a portland cement mix. This slurry is continuously dumped from a revolving mixer or other suitable mixing device onto a road surface, and as the paving vehicle proceeds along the road a rubber drag apron can be used to smooth the slurry to a uniform thickness. For this purpose graded sand aggregate containing more than 10 percent fines passing a 200-mesh sieve is preferred. For slow-setting emulsions, at least 100 seconds will usually be required to mix the emulsion with the aggregate and spread the resulting slurry on the road surface before the emulsion in the mixture breaks.

In another application, the asphalt emulsion, sand, and portland cement or diatomaceous earth can be applied to the surfaces as a mixture by the "gunnite" method, which is especially suited for coating canals, reservoirs, and the like. Such application can be made with pneumatic type spray equipment, such as a Refract-All gun. Glass wool, rock wool, hemp and other fibers can be added to the slurry or emulsion to provide coatings having higher tensile strength and which will not crack with shifting of the surface to which the coating is applied.

EXAMPLE I

Preparation of diamine

Normal-hexadecane was chlorinated in the dark at 71° C. for 7 hours at substantially atmospheric pressure to a density of 0.801 gram per cubic centimeter producing a crude product mixture containing from 20 to 25 weight percent chloroparaffins. The chlorinated portion of the crude product contained at least 85 mole percent of secondary chlorohexadecane.

The chloroparaffins were separated from the non-chlorinated paraffin by distilling, the chloroparaffins being removed as a fraction boiling at 99° C. at 0.02 mm. to 106° C. at 0.08 mm. and having a refractive index range of from 1.4485 to 1.4499. This chlorinated hexadecane contained at least 85 mole percent secondary chlorohexadecane.

The randomly chlorinated hexadecane fraction was aminated by contact with ammonia at 200° C. at autogenous pressure for 2 hours and in the presence of a quantity of methanol equal to the volume of the chloroparaffin. A 10:1 mole ratio of ammonia to chloroparaffin was used. The crude product was stripped of methanol and ammonia by heating same. The reaction mixture was then extracted with fresh methanol and the methanol extract was separated and treated with heptane. The methanol extract containing the amine hydrochloride was separated and treated with sodium hydroxide to convert the hydrochloride to the free amine. The methanol solution of the free amine was then treated with heptane to extract the free amine from the methanol. The heptane extract of free amine was first washed with water and the heptane was stripped from the free amine. The free amine product was distilled and a fraction boiling at 94° C. at 0.03 mm. to 103° C. at 0.09 mm. and having a refractive index range of from 1.4451 to 1.4458 was recovered.

The amine fraction was reacted with a 3:1 mole ratio of acrylonitrile to amine by the addition of acrylonitrile dropwise at 65° C. in about 1.5 hours. The crude product was distilled to remove cyanoethylhexadecylamine which was removed as a fraction boiling at 139° C. at 0.11 mm. to 141.5° at 0.11 mm. This fraction had a refractive index of 1.4552.

The cyanoethylhexadecylamine fraction was hydrogenated in methanol at 125° C. with hydrogen at a pressure of 1000 p.s.i.g. and in the presence of Raney nickel, as the hydrogenation catalyst. The hydrogenated material was distilled and a fraction boiling at 131° C. at 0.1 mm. to 139° C. at 0.15 mm. and having a refractive index range of from 1.4580 to 1.4582 was recovered. This fraction was substantially N-secondary-hexadecylpropylenediamine.

Asphalt emulsion test

The N-secondary-hexadecyl diamine above prepared was tested in a slow-setting asphalt emulsion formulation. For comparison purposes, a commercial diamine formed from tallow acids, hereafter referred to as fatty diamine, was also tested. Aqueous solutions containing emulsifying agents were prepared at room temperature and were charged to a colloid mill together with asphalt preheated to 270° F. and therein mixed at 195° F. Prior to blending with the asphalt, sufficient mineral acid such as hydrogen chloride was added to neutralize, i.e., pH 7, the aqueous solution. The resulting asphalt emulsion was tested for various properties including its performance in a simulated "slurry seal" application. The specific formulation and the results of the testing are shown in Table I below:

TABLE I

|  | Mono Secondary-hexadecyl Diamine | Primary Alkyl Fatty Diamine [1] |
|---|---|---|
| Asphalt, 85/100 Pen., wt. percent | 63.8 | 64.2 |
| Diamine, wt. percent | 0.4 | 0.3 |
| Nonionic Emulsifier, wt. percent [2] | 1.0 | 1.0 |
| HCl, wt. percent | 0.1 | 0.06 |
| Water, wt. percent | 34.6 | 34.3 |
| Mixing Time, seconds [3] | 120 | 180+ |
| Cement Mix Test, percent [4] | <0.1 | 4.8 |
| Modified Miscibility Test, percent [4] | 1.9 | 11.3 |

[1] Duomeen T, a commercial fatty diamine prepared from tallow acids.
[2] Triton X-114, a commercial mixture of octylphenoxypoly(ethyleneoxy)ethanols with 7-8 ethyleneoxy groups in the poly(ethyleneoxy) chain.
[3] This test is designed to simulate mixing in a slurry seal unit and utilizes a heavy 4-inch diameter, 6-inch deep container equipped with a 3-blade paddle stirrer powered by a variable speed motor. A 100-gram portion of aggregate is placed in the container and wetted with about 20 ml. of water while being stirred at low speed after which stirring speed is increased to about 100 r.p.m. From 18 to 20 grams of the dispersion-emulsion blend is added rapidly to the wet aggregate, and a timer is started the instant the blend contacts the aggregate. Mixing time is recorded at the time the mix could be stirred before the emulsion breaks, as evidenced by solidification of the mix. The mixing time should be at least 100 seconds in order to permit adequate time for mixing and applying the mix to the working, e.g. road, surface. Aggregate used in evaluating the dispersion blend according to the mixing test should have properties on the order of the following:
Source—Baxter Springs, Kansas (Kenoyer Sand).
Sieve Analysis, Wt. percent:
10+ mesh ---- 2.2
20+ mesh ---- 7.3
40+ mesh ---- 33.3
60+ mesh ---- 18.8
100+ mesh ---- 15.3
200+ mesh ---- 6.1
200− mesh ---- 7.3
Surface area: 100− fines, m.²/gm ---- <5
Composition (X-ray diffraction, 100− fines):
Alpha quartz, $SiO_2$ ---- +++
Dolomite, $CaMg(CO_3)_2$ ---- +
Calcite, $CaCO_3$ ---- +
Calcium in total aggregate as percent $CaCO_3$ ---- 3.6
[4] ASTM D244-60. Generally, Federal and State Agency requirements indicate that the lower the value the better the emulsion, the preferred value being on the order of 2.5% or less for the Cement Mix Test and on the order of 4.5% or less for the Modified Miscibility Test.

The data in Table I show that the secondary alkyl diamine produces a satisfactory, i.e. at least 1½ minute mixing time, slow-setting asphalt emulsion since it produces an emulsion having a mixing time of 120 seconds. In the Cement Mix Test, which tests the ability of the emulsion to withstand premature coagulation, the emulsion using secondary alkyl diamine shows superiority over that of the primary (fatty) diamine; similarly, in the Modified Miscibility Test, which tests the ability of the emulsion to withstand dilution with water, the emulsion utilizing the secondary alkyl diamine also shows superiority over that of the primary (fatty) diamine.

EXAMPLE II

In another series of tests the secondary alkyl diamine prepared in Example I was tested in a slow-setting emulsion formulation. To show that the secondary alkyl diamine and the asphalt emulsions thereof can tolerate the presence of minor amounts of impurities and by-products which were present in the secondary alkyl diamine, a sample of unpurified (crude) product was also tested. The unpurified product was the result of a series of synthesis steps such as those of Example I except that neither the final product nor the intermediate product purification by distillation was carried out as they were in Example I. For comparison purposes a commercial imidazoline diamine which has wide application in asphalt emulsions of this type was also tested. These specific formulations and the results of the testing are shown in Table II below:

TABLE II

|  | Slow Setting | | |
|---|---|---|---|
|  | Secondary Alkyl Diamine | Secondary Alkyl Diamine (crude) | Nalcamine [1] |
| Asphalt, 85/100 Pen, wt. percent | 63.8 | 66.0 | 63.5 |
| Diamine, wt. percent | 0.4 |  |  |
| Diamine, (crude), wt. percent |  | 0.4 |  |
| Nalcamine CAE (1), wt. percent |  |  | 0.3 |
| Triton X-114, wt. percent | 1.0 | 1.0 | 1.0 |
| HCl, wt. percent | 0.1 | 0.2 | 0.06 |
| Water, wt. percent | 34.7 | 32.4 | 35.14 |
| Mixing Time, seconds [2] | 180+ | 200+ | 120 |
| Slurry Appearance [3] | B-S | E | B-S |

[1] An imidazoline diamine.
[2] Substantially the same as that of Table I of Example I.
[3] B-S=Broken emulsion but workable suspension; E=Excellent.

In Table II both the purified and the crude secondary alkyl diamine produced emulsions with good mixing times. In the slurry appearance test both the purified and the crude secondary alkyl diamine show satisfactory results. The imidazoline type amine generally produces results which are similar and comparative to fatty type diamines such as the Duomeen T.

Reasonable variations and modifications of this invention can be made, or followed, in view of the foregoing, without departing from the spirit or scope thereof.

We claim:
1. An asphalt emulsion consisting essentially of asphalt, an aqueous dispersing liquid, mineral acid, and an effective emulsifying amount of secondary hexadecyl-1,3-propanediamine and a mixture of octylphenoxypoly(ethyleneoxy)ethanols with 7-8 ethyleneoxy groups in the poly(ethyleneoxy) chain.
2. The asphalt emulsion according to claim 1 wherein said aqueous dispersing liquid is water and said mineral acid is hydrochloric acid.
3. The asphalt emulsion according to claim 1 wherein said diamine emulsifying agent is present in the emulsion in the range of from about 0.05 to 1.5 weight percent based on the total weight of the emulsion and said octylphenoxypoly(ethyleneoxy)ethanol emulsifying agent is present in the emulsion in an amount of about 1 weight percent based on the total weight of the emulsion.

References Cited

FOREIGN PATENTS 111,080  9/1961  Pakistan.

LEON D. ROSDOL, *Primary Examiner.*

R. D. LOVERING, *Assistant Examiner.*